(12) United States Patent
Ollagnier et al.

(10) Patent No.: US 12,025,458 B2
(45) Date of Patent: Jul. 2, 2024

(54) METHOD AND SYSTEM FOR POSITIONING A VEHICLE USING AN IMAGE-CAPTURING DEVICE

(71) Applicant: SAFRAN ELECTRONICS & DEFENSE, Paris (FR)

(72) Inventors: Isabelle Ollagnier, Moissy-Cramayel (FR); Thomas Cauchy, Moissy-Cramayel (FR); Cédric Ollagnier, Moissy-Cramayel (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 0 days.

(21) Appl. No.: 17/641,637

(22) PCT Filed: Sep. 11, 2020

(86) PCT No.: PCT/EP2020/075571
§ 371 (c)(1),
(2) Date: Mar. 9, 2022

(87) PCT Pub. No.: WO2021/052890
PCT Pub. Date: Mar. 25, 2021

(65) Prior Publication Data
US 2022/0357175 A1 Nov. 10, 2022

(30) Foreign Application Priority Data
Sep. 17, 2019 (FR) .................... 1910264

(51) Int. Cl.
*G01C 21/36* (2006.01)
(52) U.S. Cl.
CPC ..... *G01C 21/3644* (2013.01); *G01C 21/3623* (2013.01); *G01C 21/3679* (2013.01)
(58) Field of Classification Search
CPC .............................................. G01C 21/3644
See application file for complete search history.

(56) References Cited

U.S. PATENT DOCUMENTS

| | | | | |
|---|---|---|---|---|
| 8,284,100 B2* | 10/2012 | Vartanian | ............... | G01S 5/013 |
| | | | | 342/357.3 |
| 10,012,735 B1* | 7/2018 | Loveland | ............... | G01S 17/89 |

(Continued)

OTHER PUBLICATIONS

Madsen, Claus, et al., "Optimal landmark selection for triangulation of robot position" see pp. 1-11, Robotics and Autonomous Systems, Elsevierbv, Amsterdam, NL, vol. 23, No. 4, Jul. 30, 1998 (Jul. 30, 1998), pp. 277-292 (DOI: 10.1016/S0921-8890(98)00014-1, ISSN:0921-8890,XP004134681)(sections 2-6) (1998).*

(Continued)

*Primary Examiner* — Jean Paul Cass
(74) *Attorney, Agent, or Firm* — Muncy, Geissler, Olds & Lowe, P.C.

(57) ABSTRACT

A method of positioning a vehicle (N) that is provided with an electronic processor unit (2) connected both to a nonoptical positioning device (3, 4) and to an optical device (5) for taking external images, the electronic processor unit (2) including a database of landmarks including at least the geographical position of each landmark and a descriptive element describing each landmark, the method comprising the steps of:
estimating a first geographical position (P1*e*) for the vehicle (N) by means of the nonoptical positioning device (3, 4);
from the database, preselecting landmarks having geographical positions situated within a predetermined radius around the first geographical position (P1*e*) of the vehicle (N);
selecting the triplets that minimize geometrical errors;
controlling the optical device (5) for taking external images to take images of the selected landmarks;
selecting images in which the landmarks are indeed visible, identifying the landmarks in the images, and,
(Continued)

from the images, measuring a relative or absolute bearing for each visible landmark; and determining a second geographical position (POraw or POc) for the vehicle (N) from the measured relative or absolute bearings, optionally while taking account of movement of the vehicle (N) while the images of the landmarks of the triplet were being taken.

10 Claims, 2 Drawing Sheets

(56) References Cited

U.S. PATENT DOCUMENTS

| | | | |
|---|---|---|---|
| 11,069,082 B1* | 7/2021 | Ebrahimi Afrouzi | H04N 23/56 |
| 11,153,503 B1* | 10/2021 | Ebrahimi Afrouzi | H04N 23/74 |
| 11,274,929 B1* | 3/2022 | Afrouzi | G01C 21/165 |
| 11,435,192 B1* | 9/2022 | Ebrahimi Afrouzi | A47L 11/4044 |
| 11,435,746 B1* | 9/2022 | Ebrahimi Afrouzi | G05D 1/0246 |
| 2012/0214511 A1* | 8/2012 | Vartanian | G01S 15/06 455/456.1 |
| 2014/0088410 A1* | 3/2014 | Wu | A61B 90/39 901/47 |
| 2018/0330528 A1* | 11/2018 | Loveland | G06F 3/0482 |
| 2019/0042829 A1* | 2/2019 | Loveland | G06T 7/30 |
| 2019/0357986 A1* | 11/2019 | Morgan | A61B 34/20 |
| 2020/0188025 A1* | 6/2020 | Becker | A61B 34/32 |
| 2021/0158563 A1* | 5/2021 | Rinck | G06T 7/70 |
| 2022/0066456 A1* | 3/2022 | Ebrahimi Afrouzi | A47L 9/2873 |

OTHER PUBLICATIONS

Madsen et al., "Optimal landmark selection for triangulation of robot position," Robotics and Autonomous Systems, vol. 23 (1998) pp. 277-292, 16 pages.

George H. Kaplan, "Angles-Only Navigation: Position and Velocity Solution for Absolute Triangulation," Navigation: Journal of the Institute of Navigation, vol. 58, No. 3 (2011) pp. 187-201, 15 pages.

Cohen et al., "A Comprehensive Study of Three Object Triangulation," SPIE vol. 1831 Mobile Robots VII (1992) pp. 95-106, 12 pages.

* cited by examiner

METHOD AND SYSTEM FOR POSITIONING A VEHICLE USING AN IMAGE-CAPTURING DEVICE

BACKGROUND OF THE INVENTION

The present invention relates to the field navigation and in particular navigation at sea.

Conventionally, navigation in the vicinity of coasts relies on taking bearings on landmarks (i.e. on identifiable objects positioned to be visible at sea and/or on coasts) in positions that are known and from which it is possible to calculate the position of the vessel by triangulation. This navigation technique is performed by an operator and is relatively time-consuming. Also, the inaccuracy of this navigation technique increases with increasing speed of the vessel.

The invention of the satellite positioning (commonly referred to by the term "global navigation satellite system" (GNSS)), as provided by way of example in the GPS, GLONASS, Galileo, and BeiDou systems has revolutionized navigation to such an extent that satellite positioning has quickly become the navigation method that is the most widespread. Specifically, those positioning systems are designed to act automatically to determine the position of a vehicle provided with a satellite signal receiver in a manner that is efficient and accurate, both close to the coast and on the high seas.

Nevertheless, in the event of the satellite signal receiver failing or in the event of satellite signals not being available (e.g. due to jamming or to satellite failure), the accuracy of the navigation system decreases.

There also exist navigation devices that include an inertial navigation system that detects the movements of a vehicle and that enable the path followed by the vehicle to be determined. Thus, knowing the starting point of the vehicle, it is possible to determine the current position of the vehicle and the path the vehicle has followed since its starting point. Nevertheless, although most navigation systems are accurate in the short term, they need to be reset periodically.

OBJECT OF THE INVENTION

A particular object of the invention is to provide means that are independent, automatic, and simple to use, and that are suitable for correcting and/or resetting a reference navigation device, e.g. such as satellite navigation or inertial navigation.

SUMMARY OF THE INVENTION

To this end, according invention, there is provided a method of positioning a vehicle that is provided with an electronic processor unit connected both to a nonoptical positioning device and to an optical device for taking external images, the electronic processor unit including a database of landmarks including at least the geographical position of each landmark and a descriptive element describing each landmark (such as an image or the mention of one or more of its characteristics). The method comprises the steps of:
estimating a first geographical position for the vehicle by means of the nonoptical positioning device;
from the database, preselecting landmarks having geographical positions situated within a predetermined radius around the first geographical position of the vehicle;
selecting at least one triplet of landmarks;
controlling the optical device for taking external images to take images of the landmarks of said at least one selected triplet of landmarks;
selecting images in which the landmarks are indeed visible, identifying the landmarks in the images, and, from the images, measuring an angle relative to a reference direction for each visible landmark (the measured angles are absolute or relative bearings); and
determining a second geographical position for the vehicle from the angles measured for the selected triplet of landmarks, the triplet of landmarks having been selected to minimize geometrical error while determining the second geographical position.

Thus, preselecting landmarks makes it possible to obtain the second geographical position relatively quickly by minimizing human intervention as much as possible. Also, the second geographical position is relatively accurate as a result of selecting the best triplet of landmarks. This second geographical position can be used to verify the positioning accuracy obtained by the nonoptical positioning device(s).

In a preferred option, the second geographical position of the vehicle is determined from the measured angles while taking account of movement of the vehicle while the images of the landmarks of the selected triplet were being taken.

The second geographical position is then even more accurate.

Then advantageously, the movements of the vehicle between taking the images relating to the selected triplet of landmarks are measured and the electronic processor unit determines movement vectors for movements between taking each of the images and taking the last image of the selected triplet of landmarks, takes the directions of the landmarks corresponding to the angles measured and offsets them along the movement vector in question, and calculates a corrected second geographical position at the intersection between the directions of the landmarks as offset in this way.

According to a particular characteristic, the method comprises, for each selected triplet of landmarks, the steps of determining the distance between the vehicle and each preselected landmark, and, when taking an image of each landmark, controlling the optical device for taking external images to adapt its image-taking field as a function of the distance of said landmark from the vehicle.

Preferably, selecting the triplet of landmarks used for determining the second geographical position comprises the steps of:
for each triplet of landmarks, determining three circles, all passing through a position estimated from the angles measured for the three landmarks in each triplet of landmarks, and each passing through a respective pair of the landmarks;
determining an area for the triangle defined by the centers of the circles for each of the triplets of landmarks; and
calculating a quality score for each triplet on the basis of the area of the triangle, the triplet that is selected being the triplet having the best quality score.

Preferably, the method includes the step of comparing the most recent geographical position obtained by means of the nonoptical positioning device with the geographical positions obtained by means of the nonoptical positioning device.

The invention also provides a vehicle navigation system arranged to perform this method.

Other characteristics and advantages of the invention appear on reading the following description of a particular and nonlimiting implementation of the invention.

BRIEF DESCRIPTION OF THE DRAWINGS

Reference is made to the accompanying drawings, in which.

DETAILED DESCRIPTION OF THE INVENTION

Figure 1:
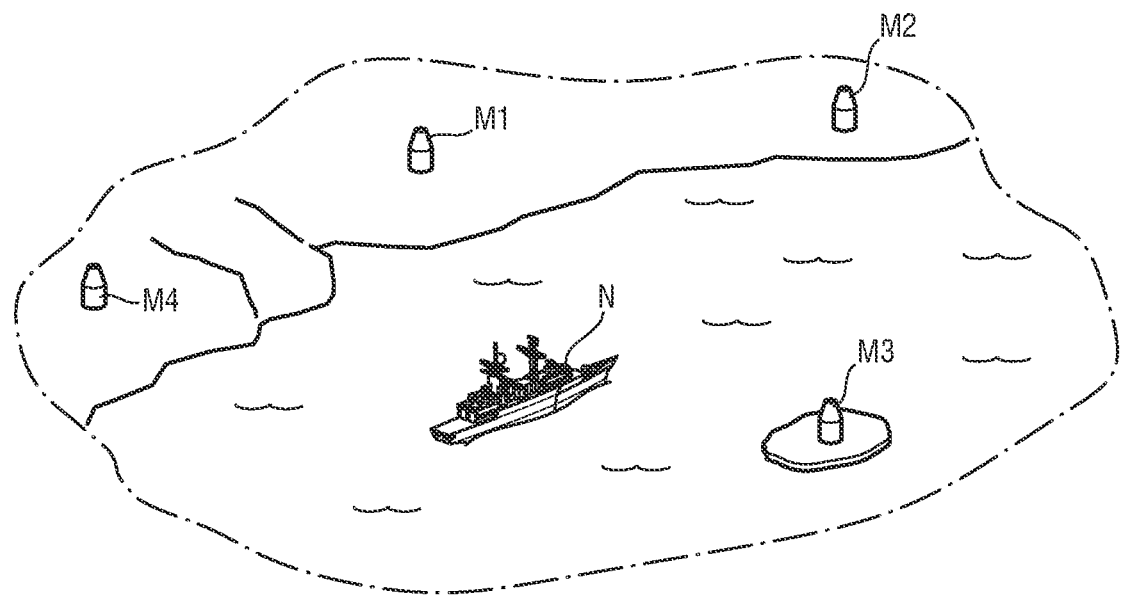
FIG. 1 is a diagrammatic view showing how the invention is implemented.
Figure 2:
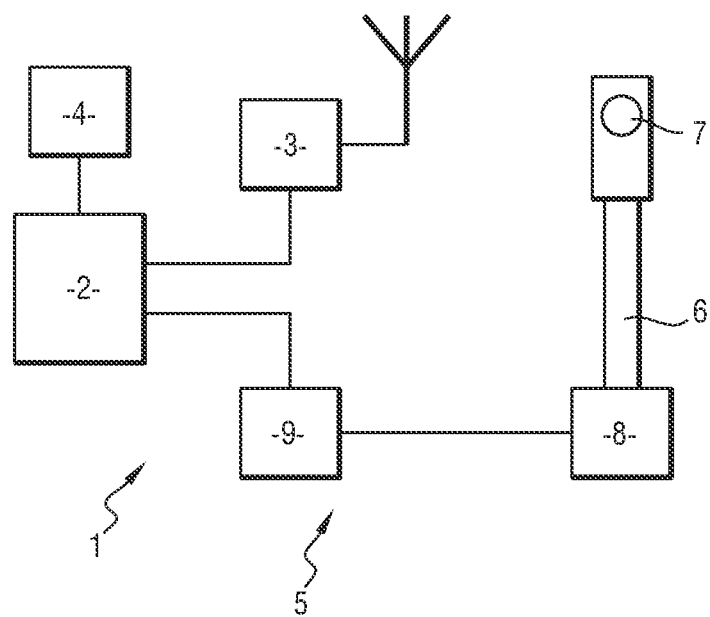
FIG. 2 is a block diagram of the navigation system of the invention.

With reference to the figures, the invention is described below its application to the navigation of a vessel N with a navigation system, given overall reference 1, including an electronic processor unit 2 connected to a satellite positioning device 3, to an inertial positioning device 4, and to an optical system for taking external images and given overall reference 5.

The satellite positioning device 3, which is itself known, comprises a satellite signal receiver and an electronic processor circuit for calculating a geographical position for the satellite receiver on the basis of the signals it receives from at least four satellites in a satellite constellation forming part of a satellite navigation system (GNSS), e.g. such as the GPS, Galileo, GLONASS, BeiDou, . . . , systems.

The inertial positioning device 4, which is likewise itself known, comprises an inertial navigation system having accelerometers positioned on the axes of a measurement reference frame and gyros arranged to detect rotations of the measurement reference frame relative to a reference reference frame. The inertial navigation system supplies the components of the movement vector of the vessel in the reference reference frame.

The optical device 5 for taking external images comprises a mast 6 having at least one optical sensor 7 mounted thereon such as a camera operating in the visible domain and/or the infrared domain. The mast 6 is associated with a motor-driven aiming member 8 for pointing the optical sensor 7 along a given bearing. The optical sensor 7 and the aiming member 8 are connected to an electronic processor unit 9 that is programmed:

to control the aiming device 8 to point the optical sensor 7 in an image-taking direction;

to control of the optical sensor 7 to adjust its image-taking parameters, such as its optical field, in order to take one or more images;

to take an azimuth bearing depending on the direction in which the optical sensor 7 is aimed; and to process and timestamp the images for forwarding to the electronic processor unit 2.

The electronic processor unit 2 includes a memory containing a navigation computer program and a database of landmarks including the geographical position of each landmark and at least one image thereof. The computer program is arranged in conventional manner to compute reference navigation corresponding to the path followed by the vessel N in the geographical reference frame. In this example, the reference navigation is hybrid navigation computed on the basis of the signals coming both from the satellite positioning device 3 and from the inertial navigation system 4, and that supplies first estimated geographical positions for the vessel N at a predetermined rate. By way of example, the computer program makes use of a bank of Kalman filters for this purpose. The computer program also includes instructions arranged to perform the method of the invention.

The method is described below on the assumption that the vessel N is navigating at sea close to the coast and in a zone in which there are landmarks (including at least four landmarks identified as M1, M2, M3, and M4 in FIG. 1), which landmarks are referenced in the database of the electronic processor unit 2.

The method of the invention begins with the step estimating a first geographical position P1$e$ for the vessel N by means of the reference navigation computation. On the basis of this position P1$e$, the electronic processer unit 2 preselects landmarks from its database, in this example M1, M2, M3, and M4, which landmarks have geographical positions that are situated within a predetermined radius around the first estimated geographical position for the vessel N. The radius in question corresponds to the range of the optical image-taking device 5.

The electronic processor unit 2 controls the optical device 5 for taking external images so as to point the optical sensor 7 roughly at the zone in the surroundings of the vessel N in which said landmark ought to be found and take images of the landmark. Knowing the geographical position of each landmark and having available the first geographical position P1$e$, the program in this example is advantageously arranged to determine an estimated distance between the landmark and the vessel N and to control the optical device 5 for taking external images to adapt its field of view for taking an image of each landmark as a function of the distance of said landmark from the vessel N. It is thus possible to have an image of better quality of the landmark in question, and above all to improve the accuracy of the bearing taken for each landmark in the images that are taken. Each image is timestamped. In this example, the total number of images is limited to twelve in order to limit the quantity of data that is to be processed and in order to limit the length of time the optical device 5 for taking external images is being used, so that it can be used for other functions, such as monitoring nearby surroundings. In the example shown in FIG. 1, four landmarks are visible.

In this example, the images taken of the landmarks are subsequently presented to an operator (displayed on the screen) together with one or more descriptive elements (name, identifier, image, . . . ) taken from the database for identifying each of the landmarks so that the operator ensures that a landmark in the database is present and identifies it in the image shown. The operator selects the images in which it is indeed possible to identify a landmark and points to the landmark in the image (this selection and pointing may be done using a touchscreen, or by using a pointer device such as a computer mouse). It is assumed that the preselection is made on the basis of the four visible landmarks M1, M2, M3, and M4.

The program then takes (i.e. measures) azimuth bearings accurately for each of the landmarks on the basis of the taken images (knowing the aiming bearing of the optical sensor 7 at the time the image was taken, it is possible to deduce the azimuth bearing of the landmark as a function of the offset between the landmark and the center of the image).

The program then makes combinations in order to determine all of the possible triplets of landmarks, specifically in this example:

M1, M2, M3;

M1, M2, M4;

M1, M3, M4;
M2, M3, M4.

It should be observed that if one of the landmarks is not visible in any of the images taken, then all of the triplets including that landmark are discarded.

For each of the landmark triplets that are conserved, the program determines a raw second geographical position by proceeding as follows, as described with reference to the triplet M1, M2, M3.

Figure 3:
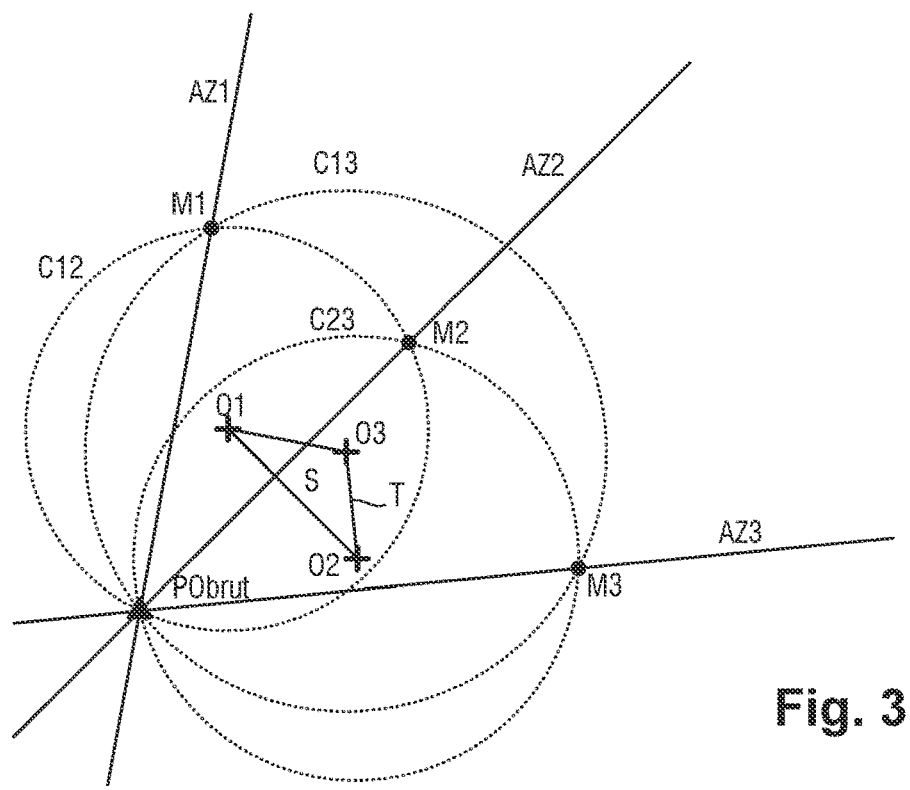
FIG. 3 is a diagrammatic view showing how the second geographical position is calculated without taking account of movement of the vehicle.

As shown in FIG. 3, the program determines a raw second geographical position POraw for the vessel N at the intersection between the azimuth bearing AZ1 of the landmark M1, the azimuth bearing AZ2 of the landmark M2, and the azimuth bearing AZ3 of the landmark M3, these three azimuth bearings resulting from the optical measurements performed on the images taken.

Thereafter, the program determines three circles all passing through the raw second geographical position POraw and each passing through the geographical positions of a respective pair of the landmarks, specifically:

the circle C12 of center O1, passing through the raw second geographical position POraw and through the geographical positions of the landmarks M1 and M2;

the circle C13 of center O3, passing through the raw second geographical position POraw and through the geographical positions of the landmarks M1 and M3; and the circle C23 of center O2, passing through the raw second geographical position POraw and through the geographical positions of the landmarks M2 and M3.

The centers O1, O2, and O3 define a triangle T of area s, and the triplet of landmarks M1, M2, M3 is given a quality score proportional to 1/s.

This calculation is performed for each of the four triplets of selected landmarks, and the landmark triplet having the best quality score (and thus the triangle T of smallest area) is retained: in this example the triplet M1, M2, M3.

The program then calculates a corrected second geographical position POc that takes account of the movement of the vessel N while taking the images of the landmarks M1 M2, and M3 of said triplet that has been retained.

Figure 4:
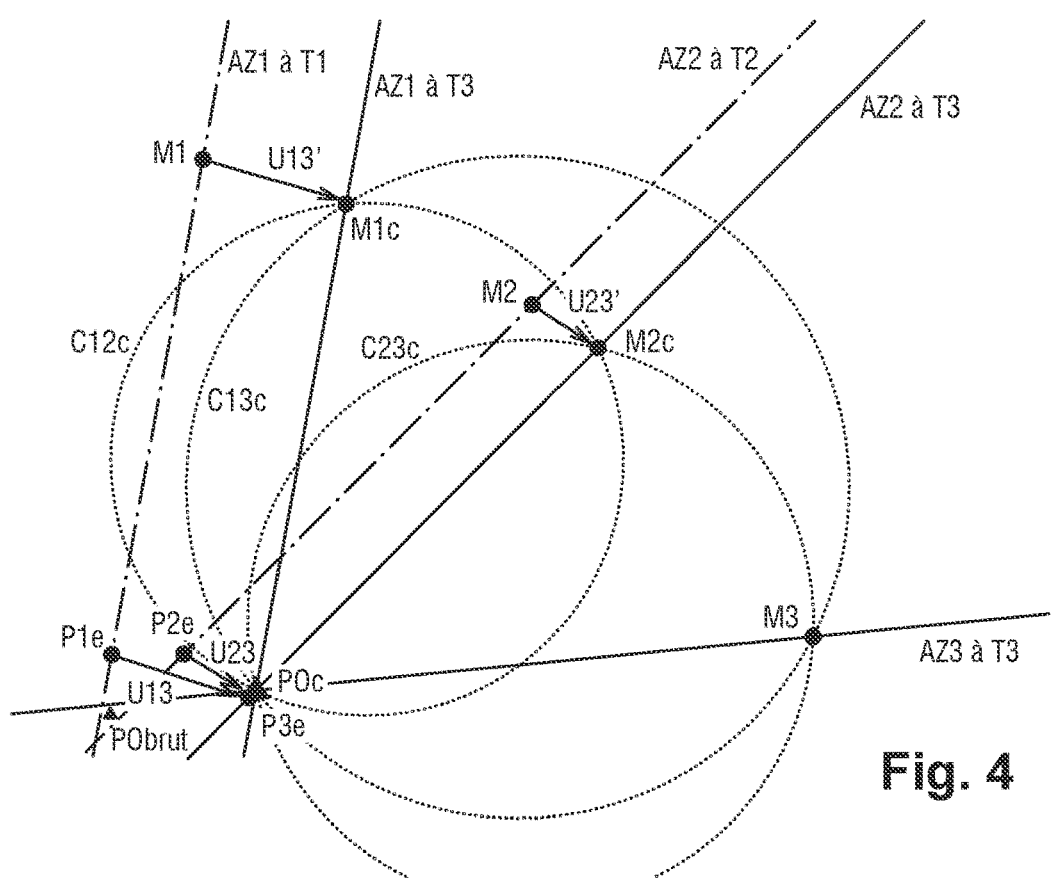
FIG. 4 is a diagrammatic view showing how the second geographical position is calculated while taking account of the movement of the vehicle.

As shown in FIG. 4, and assuming that the azimuth bearing AZ1 was taken at time T1, the azimuth bearing AZ2 was taken at time T2, and the azimuth bearing AZ3 was taken at time T3, the program is arranged to determine a vector U13 that is representative of the movement of the vessel N between the instants T1 and T3 and a vector U23 representative of the movement of the vessel N between the instants T2 and T3, by making use of the first geographical positions P2e and P3e calculated at the time T2 and T3 by the inertial navigation system in gyrocompass mode. The program then offsets the azimuth bearing AZ1 parallel to itself along the vector U13 and the azimuth bearing AZ2 parallel to itself along the vector U23 as though all three azimuth bearings AZ1, AZ2, and AZ3 were taken simultaneously. The program then calculates a corrected second geographical position POc at the intersection of the offset azimuth bearings AZ1 and AZ2 with the azimuth bearing AZ3. At this point, the program can also determine three other circles passing through the corrected second geographical position and through the geographical positions of respective pairs of the landmarks, can calculate the area of the triangle defined by the centers of these circles, and can give a quality score to the triplet of landmarks.

The program compares the first geographical position P3e with the corrected second geographical position POc in order to detect any anomaly in the hybridized navigation. It is also possible to compare the first geographical position P3e and the raw second geographical position POraw with each other.

The program may also make provision for resetting the reference navigation on the corrected second geographical position, e.g. when it finds that the quality is greater than a threshold corresponding to a sufficient level of accuracy for the corrected second geographical position.

Naturally, the invention is not limited to the implementation described, but covers any variant coming within the ambit of the invention as defined by the claims.

In particular, the navigation system of the invention may be of structure that is different from that described.

The system may include one or more nonoptical positioning devices, such as an inertial, satellite, or other positioning device. The navigation need not necessarily be hybridized.

The device for taking external images may comprise a single optical sensor that is movable or stationary, or it may comprise a plurality of optical sensors, e.g. arranged in a ring. The optical device for taking external images may be dedicated to performing the method of the invention or it may perform a plurality of functions.

Adjusting the field or any other image-taking parameter while taking images of landmarks is optional.

The optical device may take bearings that are absolute or relative.

The processing may be performed by any type of calculation member such as a processor, a microcontroller, a field programmable gate array (FPGA), . . . .

The landmarks may be identified manually and/or they may be selected automatically by means of a neural network using a deep learning method.

It is possible to make use of hybridized navigation for determining the movements of the vessel between T1, T2, and T3.

The number of images taken in a single turn may be greater than twelve.

There is no limit on the number of landmark triplets that may be selected. Thus, all of the landmark triplets may be used for calculating a corresponding number of corrected second geometrical positions, with the corrected second geometrical position that is retained for comparison purposes being the one that is associated with the best quality score.

The method of the invention is applicable to any type of vehicle for travel on water, air, or land.

The following operations are optional: the movements of the vehicle N between taking the images relating to the selected triplet of landmarks are measured and the electronic processor unit determines movement vectors U13 and U23 for movements between taking each of the images and taking the last image of the selected triplet of landmarks, takes the directions of the landmarks corresponding to the angles measured and offsets them along the movement vector in question, and calculates a corrected second geographical position POc at the intersection between the directions of the landmarks as offset in this way. Specifically, it is possible to take no account of the movement of the vehicle N while taking the images of the landmarks in the triplet in order to determine the second geographical positions POraw and POc of the vehicle N. Nevertheless, taking this movement into account improves the accuracy of the position when the vehicle is very fast and/or when the time between taking the optical measurements is long.

Independently of or in addition to the above operations, it is particularly advantageous to make provision for the selection of the triplet of landmarks to comprise the following steps:

for each triplet of landmarks, determining three circles C12, C13, and C23, all passing through a position estimated from the angles measured for the three landmarks in each triplet of landmarks, and each passing through a respective pair of the landmarks;

determining an area s for the triangle T defined by the centers O1, O2, and O3 of the circles C12, C13, and C23 for each of the triplets of landmarks; and calculating a quality score for each triplet on the basis of the area s of the triangle T, the triplet that is selected being the triplet having the best quality score.

In addition to making this selection, it is particularly advantageous, for each selected triplet of landmarks, to determine the distance between the vehicle N and each preselected landmark, and, when taking an image of each landmark, to control the optical device 5 for taking external images to adapt its image-taking field as a function of the distance of said landmark from the vehicle N. Nevertheless, these operations can be undertaken in association with the triplet of landmarks being selected in a different way.

The invention claimed is:

1. A method of positioning a vehicle that is provided with an electronic processor unit connected both to a nonoptical positioning device and to an optical device for taking external images, the electronic processor unit including a database of landmarks including at least the geographical position of each landmark and a descriptive element describing each landmark, the method comprising the steps of:
    estimating a first geographical position for the vehicle by means of the nonoptical positioning device;
    from the database, preselecting landmarks having geographical positions situated within a predetermined radius around the first geographical position of the vehicle and determining the distance between the vehicle and each preselecting landmark;
    selecting at least one triplet of landmarks among the preselected landmarks;
    successively pointing the optical device for taking external images at each landmark of said at least one selected triplet of landmarks and controlling the optical device to take images of the landmark towards which the optical device is pointed while adapting, for taking an image of said landmark, an image-taking field of the optical device as a function of the determined distance of said landmark from the vehicle;
    selecting images in which the landmarks are indeed visible, identifying the landmarks in the images, and, from each image, measuring an angle relative to a reference direction for each visible landmark; and
    determining a second geographical position for the vehicle from the angles measured for the selected triplet of landmarks, the triplet of landmarks having been selected to minimize geometrical error while determining the second geographical position.

2. The method according to claim 1, wherein the second geographical position of the vehicle is determined from the measured angles while taking account of movement of the vehicle while the images of the landmarks of the triplet were being taken.

3. The method according to claim 2, wherein the movements of the vehicle between taking the images relating to the selected triplet of landmarks are measured and the electronic processor unit determines movement vectors for movements between taking each of the images and taking the last image of the selected triplet of landmarks, takes the directions of the landmarks corresponding to the angles measured and offsets the directions of the landmarks along the movement vector in question, and calculates a corrected second geographical position at the intersection between the directions of the landmarks as offset along the movement vector in question.

4. The method according to claim 1, wherein selecting the triplet of landmarks comprises the steps of:
    for each triplet of landmarks, determining three circles, all passing through a position estimated from the angles measured for the three landmarks in each triplet of landmarks, and each passing through a respective pair of the landmarks;
    determining an area for the triangle defined by the centers of the circles for each of the triplets of landmarks; and
    calculating a quality score for each triplet on the basis of the area of the triangle, the triplet that is selected being the triplet having the best quality score.

5. The method according to claim 1, including the step of comparing the most recent geographical position obtained by means of the nonoptical positioning device with the geographical positions obtained by means of the nonoptical positioning device.

6. A vehicle navigation system comprising an electronic processor unit connected to a nonoptical positioning device and to an optical device for taking external images, the electronic processor unit including a database of landmarks including at least the geographical position of each landmark and a descriptive element describing each landmark and being programmed to:
    estimate a first geographical position for the vehicle by means of the nonoptical positioning device;
    from the database, preselect landmarks having geographical positions situated within a predetermined radius around the first geographical position of the vehicle and determining the distance between the vehicle and each preselecting landmark;
    select at least one triplet of landmarks;
    successively point the optical device for taking external images at each landmark of said at least one selected triplet of landmarks and control the optical device to take images of the landmark towards which the optical device is pointed while adapting, for taking an image of each landmark, an image-taking field of the optical device as a function of the determined distance of said landmark from the vehicle;
    select images in which the landmarks are indeed visible, identifying the landmarks in the images, and, from the images, measure an angle relative to a reference direction for each visible landmark; and
    determine a second geographical position for the vehicle from the angles measured for the selected triplet of landmarks, the triplet of landmarks having been selected to minimize geometrical error while determining the second geographical position.

7. The system according to claim 6, wherein the optical device for taking external images including motor drive connected to the electronic processor unit.

8. The system according to claim 6, wherein the nonoptical positioning device comprises a receiver for receiving signals from positioning satellites.

9. The system according to claim 6, wherein the nonoptical positioning device comprises an inertial navigation system.

10. A method of positioning a vehicle that is provided with an electronic processor unit connected both to a nonoptical positioning device and to an optical device for taking external images, the electronic processor unit including a database of landmarks including at least the geographical position of each landmark and a descriptive element describing each landmark, the method comprising the steps of:

- estimating a first geographical position for the vehicle by means of the nonoptical positioning device;
- from the database, preselecting landmarks having geographical positions situated within a predetermined radius around the first geographical position of the vehicle and determining the distance between the vehicle and each preselecting landmark;
- selecting at least one triplet of landmarks among the preselected landmarks;
- at successive times pointing the optical device in an aiming bearing at each landmark of said at least one selected triplet of landmarks and controlling the optical device to take image of the landmark towards which the optical device is pointed while adapting, for taking an image of said landmark, an image-taking field of the optical device as a function of the determined distance of said landmark from the vehicle;
- selecting images in which the landmarks are indeed visible, identifying the landmarks in the images, and, from each image, knowing the aiming bearing of the optical sensor at the time the image was taken, deduce an azimuth bearing of the visible landmark as a function of the offset between the landmark and the center of the image; and
- determining a second geographical position for the vehicle from the azimuth bearing of each landmark of the selected triplet of landmarks, the triplet of landmarks having been selected to minimize geometrical error while determining the second geographical position.

* * * * *